US008511658B2

(12) United States Patent
Moessnang

(10) Patent No.: US 8,511,658 B2
(45) Date of Patent: Aug. 20, 2013

(54) VIBRATING HAND-HELD POWER TOOL

(75) Inventor: Franz Moessnang, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 674 days.

(21) Appl. No.: 12/148,700

(22) Filed: Apr. 21, 2008

(65) Prior Publication Data

US 2008/0277846 A1 Nov. 13, 2008

(30) Foreign Application Priority Data

May 11, 2007 (DE) ......................... 10 2007 000 270

(51) Int. Cl.
*F16F 1/06* (2006.01)

(52) U.S. Cl.
USPC ........................................... 267/174; 267/169

(58) Field of Classification Search
USPC ...... 267/137, 169, 170, 174, 178; 173/162.1, 173/162.2, 210, 211
See application file for complete search history.

(56) References Cited

U.S. PATENT DOCUMENTS

| | | | | |
|---|---|---|---|---|
| 1,404,464 | A * | 1/1922 | Meyer | 267/290 |
| 3,141,660 | A * | 7/1964 | Clarke et al. | 267/166 |
| 4,712,778 | A | 12/1987 | Newman | 367/170 |
| 7,412,959 | B2 | 8/2008 | Wolf et al. | 123/198 E |
| 2004/0119216 | A1 | 6/2004 | Menzel et al. | 267/166 |
| 2006/0000438 | A1* | 1/2006 | Wolf et al. | 123/198 E |

FOREIGN PATENT DOCUMENTS

| | | |
|---|---|---|
| DE | 10 2004 031866 | 1/2006 |
| WO | WO 94 16864 | 8/1994 |

* cited by examiner

*Primary Examiner* — Bradley King
*Assistant Examiner* — Nicholas J Lane
(74) *Attorney, Agent, or Firm* — Davidson, Davidson & Kappel, LLC

(57) ABSTRACT

A hand-held power tool includes an antivibration element (1) for vibrationally decoupling a handle sub-assembly (6) from another sub-assembly (5) that vibrates along a vibration axis (A), and having a coil spring (7) oriented along the vibration axis (A), and a threaded plug (3) provided with an outer thread (4) longitudinally extending therealong, with the coil spring (7) having a plurality of windings (2) extending along a preload region (V) and screwed on the outer thread (4) under an axial compressive preload, and with the outer thread (4) having a between-flight width (Z) greater than a diameter (D) of the spring wire of which the coil spring (7) is formed.

10 Claims, 2 Drawing Sheets

VIBRATING HAND-HELD POWER TOOL

BACKGROUND OF THE INVENTION

1. Field of the Invention

The present invention relates to a hand-held power tool and, in particular hammer drill or chisel hammer, including a sub-assembly that vibrates along a vibration axis, a handle sub-assembly, and an antivibration element for vibrationally decoupling the handle sub-assembly from the first-mentioned sub-assembly.

2. Description of the Prior Art

Usually, in vibrating hand-held power tool, the handle is decoupled from vibration-transmitting parts to a most possible extent, with the handle being connected with a vibrating part or sub-assembly by an antivibration element. The antivibration element can have both spring and damping characteristics.

At infinitesimal stresses, each spring rate characteristic is linear, which is typical for low-loaded helical springs. At large stresses, dependent on material properties, the spring rate characteristic is increasingly non-linear, in particular, when elastomers are used. In addition, a spring with a non-linear spring rate characteristic can be realized by using a suitable spring geometry, e.g., a leaf spring, or by further constructive features such as, e.g., a one-side positive contact.

International application WO 94 16864 discloses an axially percussive hand-held power tool in which there is provided an antivibration element for decoupling a handle from an axially vibrating sub-assembly of the power tool and having a nonlinear spring rate characteristic that passes, on opposite sides of a lineal flat middle load region, smoothly into a progressive course. To this end, the antivibration element is formed as an elastomeric hollow cylinder or, alternatively, as a leaf spring hollow cylinder. The drawback of a hollow cylinder for use in damping of vibration of a hand-held power tool consists in its pronounced dependence on the temperature and humidity and in changes associated with aging. The metallic leaf spring hollow cylinder is an expensively produced complex part.

German Publication DE 10 2004 031866 discloses an antivibration element for vibration-damping of a handle of a vibrating hand-held power tool and which has an axial non-linear spring rate characteristic or curve. The known antivibration element consists of a spring wire coil spring with the opposite ends of the coil spring being wound on a threaded plug. The coil spring windings partially abut a side of the outer thread of the threaded plug the between-flight width of which is greater than the spring wire diameter. The obtained spring rate characteristic passes smoothly after a linear flat loading region in a progressively increasing stretch and then smoothly in a steep linear stretch. The core of the thread plug is, spring-side, axially convexly-diminishing, proceeding from the inner diameter of the coil spring.

The object of the invention is to provide a hand-held power tool with an antivibration element having an axial non-linear spring rate characteristic that has a steep stretch on both sides of a linear middle loading region.

Another object of the present invention is to provide a hand-held power tool with an antivibration element having an axial non-linear spring rate characteristic at a transverse loading.

SUMMARY OF THE INVENTION

These and other objects of the present invention, which will become apparent hereinafter are achieved by providing a hand-held power tool of the type discussed above in which the antivibration element has a coil spring formed of a spring wire and oriented along the vibration axis, and a threaded plug provided with an outer thread longitudinally extending therealong, with the coil spring having a plurality of windings extending along a preload region and screwed on the outer thread under an axial compressive preload, and with the outer thread having a between-flight width greater than a diameter of the spring wire of which the coil spring is formed.

The compressive preload of a portion of the spring wire coil spring and of the outer thread of the threaded plug provides, on opposite sides of a linear flat middle region, in which all of the winding in that region lie free, edge regions, respectively, with steeper characteristics and in which a portion of the windings abuts the outer thread and, therefore, the windings of this abutting portion are not any more effective. In the low-loaded region, in which a portion of the windings is compressively preloaded in the preload region, the spring rate characteristic is linearly steep because only the free-lying windings are operative. In the high-loaded region, in which an increased portion of windings within the preload region abuts portions of the outer thread, the spring rate characteristic progressively increases because an increasingly smaller number of winding is elastically effective. In the highest-loaded region, in which the windings within the preload region, spring-side, completely abut the outer thread, the spring rate characteristic is linearly steep, as only the free-lying windings are elastically effective.

In order to achieve the compressive preload, the preload region, which is inwardly limited by the thread ends of the outer thread, should be shorter than the outer limited portion of the unloaded coil spring with the same number of windings. Thus, the coil spring outwardly abuts the inside contact surfaces of the thread ends, whereby the coil spring becomes compressively preloaded until in the middle region, it is adequately shortened and, thus, becomes disengaged from one contact surface.

Advantageously, the coil spring has a cylindrical shape and the windings have a uniform pitch. This permits the use of a standard spring.

Advantageously, the outer thread has a spring-side contact surface having a non-linear pitch. This provides for variation of the spring rate characteristic with respect to the progressive stretch in the high-loaded region.

Advantageously, the outer thread is a rectangular thread, whereby the contact surfaces are axially oriented (in their longitudinal cross-section).

Advantageously, the coil spring has a radial extent that at least as large as the diameter of the spring wire of which the coil spring is formed. This provides for formation of the contact surfaces of the outer thread also, at a combined transverse loading.

Advantageously, the threaded plug has a core that, spring-side, is axially convexly diminishes, proceeding from an inner diameter of the coil spring. Thereby at a transverse load, separate windings radially abut the threaded plug core at a transverse load, leading to a transverse progression.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
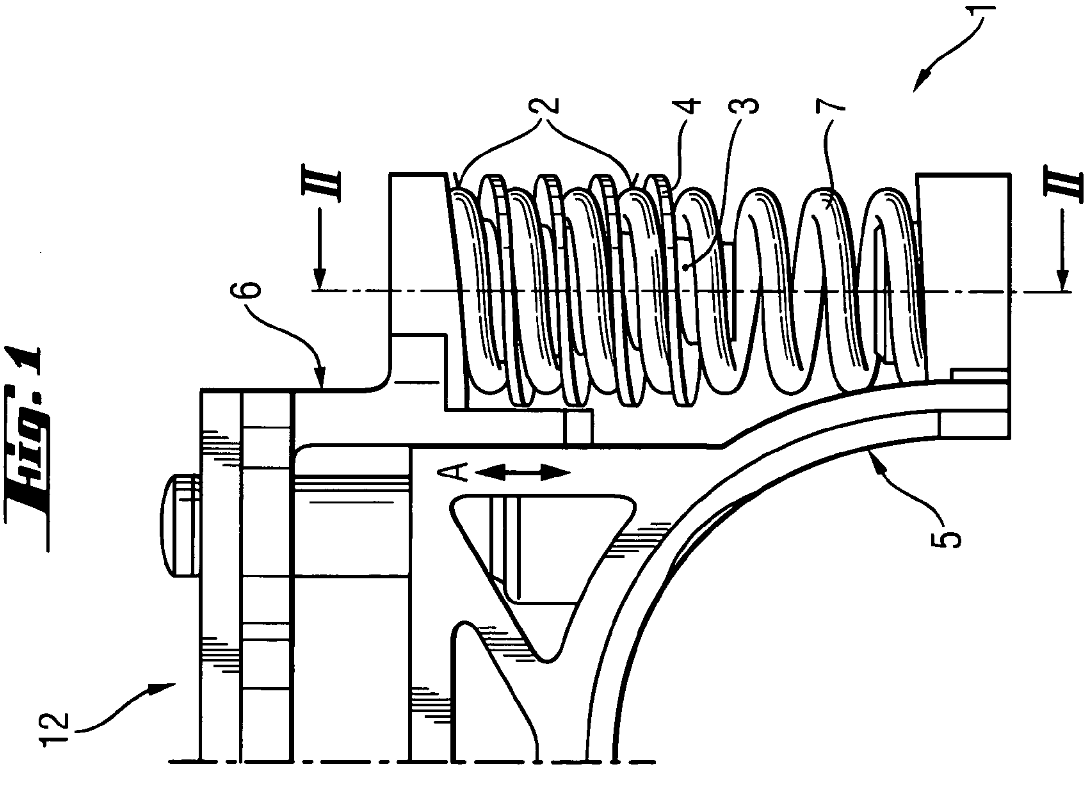
FIG. 1 a side view of a detail of a vibrating hand-held power according to the present invention with vibration decoupling.

A hand-held power tool 12, a detail of which is shown in FIG. 1, is formed as a chisel hammer and includes an antivibration element 1 arranged between a vibrating sub-assembly 5 that vibrates along a vibration axis A and a vibration-decoupled handle sub-assembly 6. The antivibration element 1 has a coil 7 which is formed of a spring wire, is oriented along the vibration axis A, and has a plurality of windings 2 that are wound at one end of the coil 7 on a threaded plug 3 provided with an outer thread 4. The antivibration element 1 has a cylindrical shape and the same pitch of the windings 2.

Figure 2:
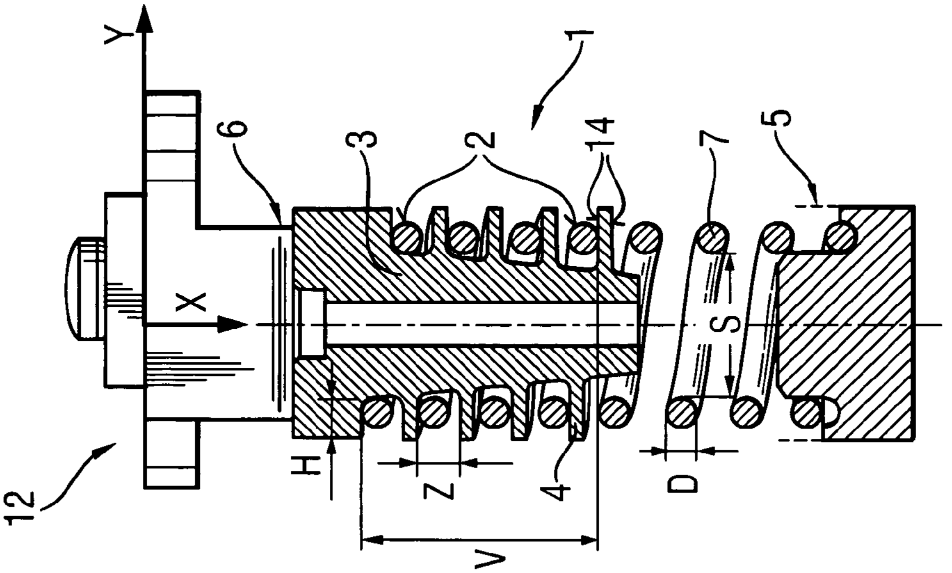
FIG. 2 a longitudinal cross-sectional view of an unloaded antivibration element along line II-II in FIG. 1.

As shown in FIG. 2, in a case of loading of the antivibration element 1 in which it is not subjected to a compression load, different winding 2, contact axially, both spring-side and plug-side in a preload region V, contact surfaces 14 of the outer thread 4. The width Z between the flights of the outer thread 4 is greater than a diameter D of the spring wire coil is formed off. Different windings 2 of the spring wire coil 7 contact both surfaces 14 of the outer thread 4. The outer thread 4, which is formed as a rectangular thread, has a uniform pitch with regard to its spring-side contact surfaces 14 (analogously, a non-linear pitch is possible, which is not explicitly shown). The radial height H of the outer thread 4 is greater than the spring wire diameter D. The coaxial, inwardly located core of the threaded plug 3 diminishes axially, spring side, convexly, starting from the coil inner diameter S.

Figure 3:
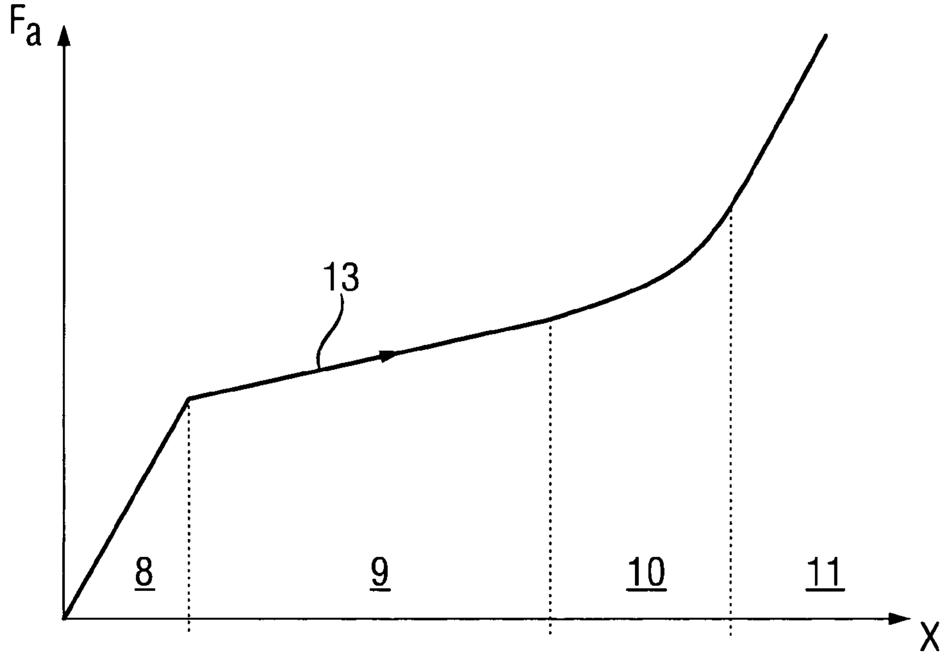
FIG. 3 a spring rate curve at an axial loading.

As shown in FIG. 3, the spring rate curve 13 (axial load X, axial force Fa) has on opposite sides, a linear flat middle region 9 in which all of windings 2 (FIG. 2) lie loosely, and respective edge regions 8, 10 having a more steep curve or characteristic and in which the windings 2 (FIG. 2) only partially axially lie on the outer thread 4. In the unloaded edge region 8, a preloaded portion of the winding 2 in the preloaded region V (FIG. 2) is ineffective, and, therefore, a linear, steeper spring rate curve extends up to the point of overcoming the preload. The transition to the middle region 9 forms a kink in the spring rate curve. In a high-loaded region 10, a portion of the windings 2 constantly abuts axially the outer thread 4 (FIG. 2) so that a progressively increasing spring rate curve is produced. In the highest-loaded region 11 in which the winding 2 (FIG. 2) in the preloaded region V (FIG. 2) completely abut the spring side contact surfaces 14 of the outer thread 4 (FIG. 2), the spring rate curve increases linearly as only the free-lying portion of the windings 2 (FIG. 2) acts resiliently.

Figure 4:
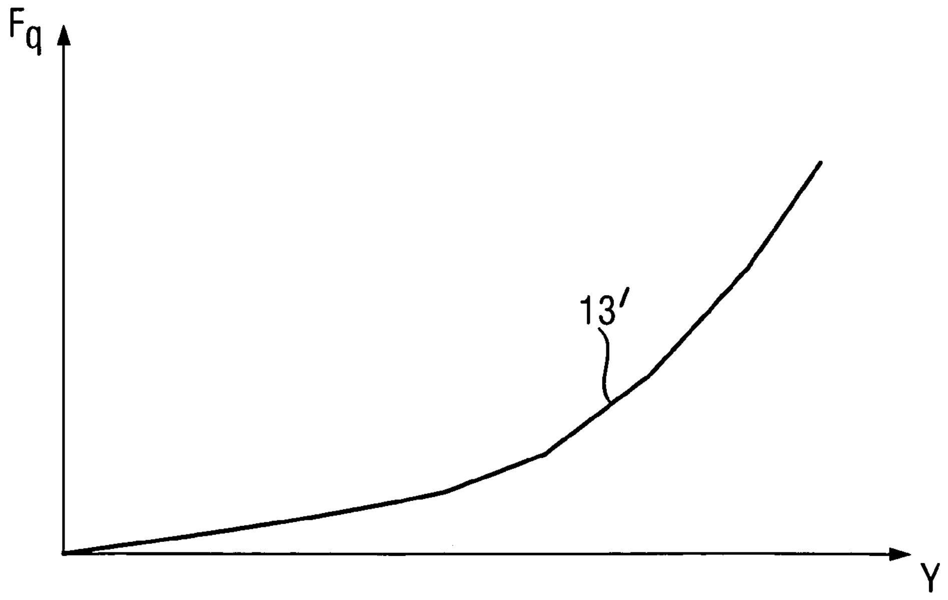
FIG. 4 a spring rate curve at a transverse loading.

According to FIG. 4, the spring rate curve 13' (transverse stress 4, transverse force Fq) has a transverse progression with increase of the transverse load, with separate windings 2 (FIG. 2) abutting radially below the convex core of the threaded plug 3 (FIG. 2) (not shown).

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A hand-held power tool, comprising:

a sub-assembly that vibrates along a vibration axis;

a handle sub-assembly; and an antivibration element for vibrationally decoupling the handle sub-assembly from the vibrating sub-assembly and having a coil spring formed of a spring wire and oriented along the vibration axis, and a threaded plug provided with an outer thread longitudinally extending therealong, the coil spring having a plurality of windings extending along a preload region and screwed on the outer thread under an axial compressive preload, the outer thread having a between-flight width greater than a diameter of the spring wire of which the coil spring is formed, wherein the coil spring has an increasing spring rate curve thoughout an entirety of the spring rate curve, wherein the spring rate curve has a first section and a second section following the first section, the second section increasing less steeply than the first section, and wherein the spring rate curve has a third section following the second section and increasing more steeply than the second section.

2. The hand-held power tool according to claim 1, wherein the coil spring has a cylindrical shape, and the windings have a uniform pitch.

3. The hand-held power tool according to claim 1, wherein the outer thread has a plurality of flights, wherein the between-flight width between flights is constant, and wherein, when under the axial compressive preload, and without external force, some of the plurality of windings contact a top side of an adjacent one of the flights and others of the plurality of windings contact a bottom side of an adjacent one of the flights.

4. The hand-held power tool according to claim 1, wherein the outer thread is a rectangular thread.

5. The hand-held power tool according to claim 1, wherein the outer thread has a radial extent that is at least as large as the diameter of the spring wire of which the coil spring is formed.

6. The hand-held power tool according to claim 1, wherein the threaded plug has a core having an outer diameter that convexly diminishes between a first end and a second end thereof, the outer diameter of the first end being equal to an inner diameter of the coil spring.

7. The hand-held power tool according to claim 1, wherein the first section increases linearly.

8. The hand-held power tool according to claim 7, wherein the second section increases linearly, a transition between the first and sections forming a kink in the spring rate curve.

9. The hand-held power tool according to claim 1, wherein the third section increases at a progressively increasing spring rate.

10. The hand-held power tool according to claim 9, wherein the spring rate curve has a fourth section following the third section, the fourth section increasing linearly.

* * * * *